Patented Feb. 3, 1925.

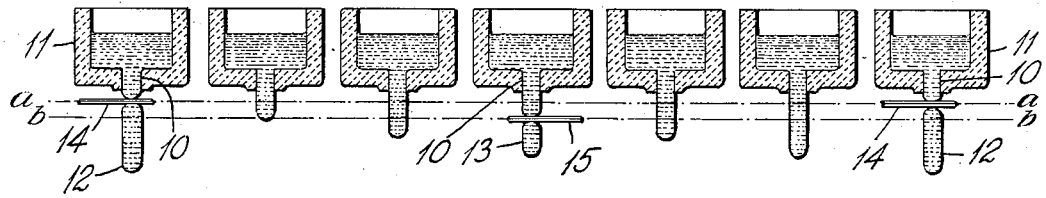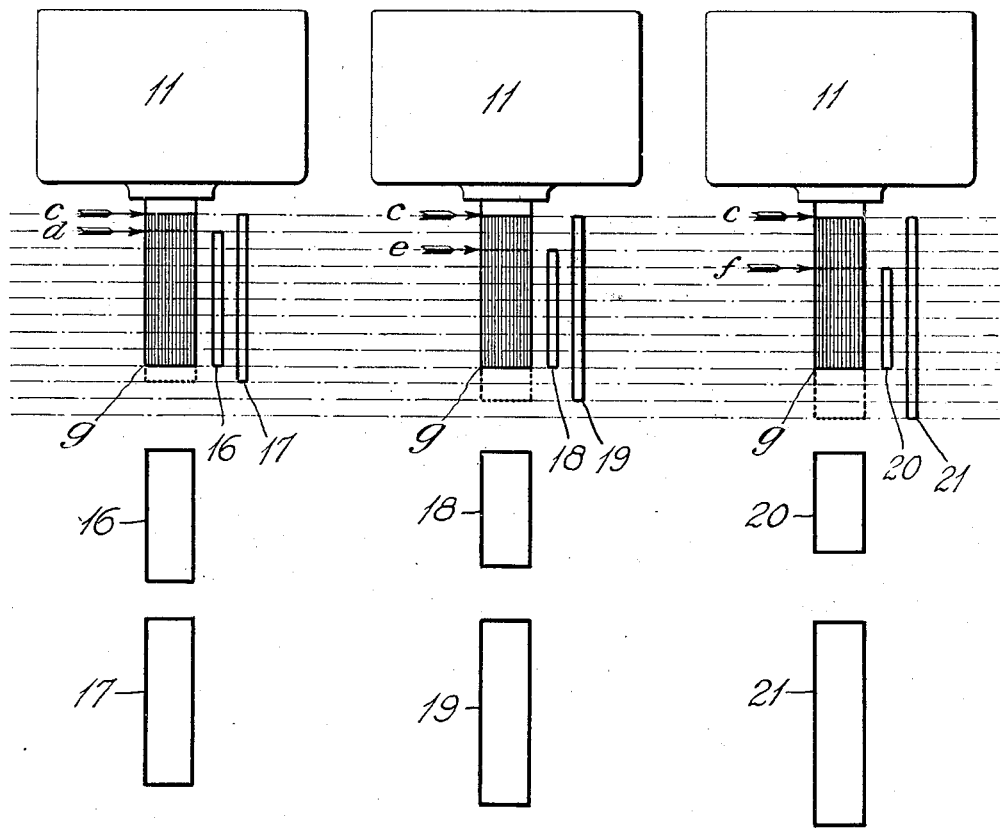

1,525,189

UNITED STATES PATENT OFFICE.

WILLIAM A. LORENZ, OF HARTFORD, CONNECTICUT, ASSIGNOR, BY MESNE ASSIGNMENTS, TO HARTFORD-EMPIRE COMPANY, OF HARTFORD, CONNECTICUT, A CORPORATION OF DELAWARE.

METHOD OF OBTAINING VARYING CHARGES OF MOLTEN GLASS.

Application filed April 4, 1922. Serial No. 549,448.

*To all whom it may concern:*

Be it known that I, WILLIAM A. LORENZ, a citizen of the United States, residing at Hartford, in the county of Hartford and State of Connecticut, have invented new and useful Improvements in Methods of Obtaining Varying Charges of Molten Glass, of which the following is a specification.

This invention relates to methods of producing mold charges from molten glass for making glassware, the object being to produce mold charges of different sizes and weights in a desired order of succession.

By suitably varying the size of the charges in a given series and repeating the series, a plurality of molds or shaping machines for making glassware of different sizes or weights may be regularly and continuously supplied with the required sizes of mold charges, and in the required order, from a single feeding machine. All of the charges in a given series may be of different sizes, or two or more of them may be of equal size.

This method of producing the different size charges consists in severing the molten glass as it is discharged from a container, either by the use of a plurality of severing devices operating in different planes, or by a single severing device moved or manipulated in such a manner as to sever the discharged glass at different levels in a suitable order.

The length and size of any mold charge obtained by the present method is proportionate to the distance of the plane in which it is severed from the plane in which the preceding charge was severed, assuming a given size outlet with a given rate of discharge and equal time periods of severing.

The amount of glass discharged during any cycle of operation of the machine, for producing the different size charges in the series, is dependent on the rapidity of flow, which may be varied by means of an adjustable regulating plug or valve in or adjacent the discharge outlet, or by varying the depth of glass, and hence the hydrostatic head over the outlet by means of an adjustable gate controlling the flow of glass to the container from a melting furnace or other source of supply, both of these methods being well known.

Different apparatus may be employed for practicing the methods disclosed herein, but I prefer to employ an apparatus of the type shown in one of my co-pending applications, filed of even date herewith.

The charges, when severed, may be distributed and delivered to a set or series of the intended molds on one or more shaping machines, by a suitable delivering mechanism, such as that shown in U. S. Patent No. 1,373,202, dated March 29, 1921.

In the drawings:—

Figures 1 to 7 inclusive are a series of diagrammatic views illustrating the effects of severing the glass at different levels.

Figs. 8 to 10 inclusive illustrate diagrammatically the effect of varying the distance between the severing planes.

In Figs. 1 to 7 inclusive, the molten glass is shown discharging from the outlet 10 of a container 11, and the mold charges of different sizes, indicated at 12 and 13 may be obtained by severing at different levels, either by the same shears, or by separate shears 14 and 15 operating in alternation, or in any other order desired. The severing operations are shown as taking place at planes *a—a* and *b—b* in Figs. 1, 4 and 7. The successive figures are spaced equal distances apart to represent equal time intervals, say, for example, periods of one second, so that the severing operation at the lower level in Fig. 4 will take place three seconds after that at the upper level in Fig. 1, and the severing operation in Fig. 7 three seconds after that in Fig. 4. Assuming that the distance between the severing planes *a—a* and *b—b* is one inch, and further assuming that the glass flows uniformly at the rate of one inch per second, then the length of glass discharged between severing periods of three seconds will be three inches. Starting with a severed charge at the lower level in Fig. 4, the length of the charge to be severed at the end of the three second period in Fig. 7 will be four inches, because period in Fig. 7 will be four inches, because the plane *a—a* is one inch above the plane *b—b*. At the end of the three second period between Figs. 1 and 4, the charge 13 will be only two inches long, because by severing at the lower level one inch is subtracted from the three inches of glass discharged during the three second period.

Stated in another way, of two mold charges severed at different planes, the longer mold charge is longer than the shorter charge by approximately twice the distance between the severing planes, still assuming a uniform rate of flow and equal time periods between severances.

In practice the rapidity of discharge increases somewhat with the increasing weight of the discharged suspended mass, and allowance should be made for this variation through regulation of the distance between the severing planes.

The effect of severing at different planes is further illustrated in Figs. 8, 9 and 10. In Fig. 8 the severing planes are indicated by the lines $c$—$d$ and in Fig. 9 by the lines $c$—$e$, while in Fig. 10 they are indicated by the lines $c$—$f$. The shaded areas $g$ in Figures 8, 9 and 10 are equal and represent, in each case, one-half the aggregate amount assumed to be discharged in a single cyclic period, during which two severing operations take place after equal time intervals. These figures show how the aggregate amount discharged during a complete cycle, equalling twice the amount $g$, is divided into unequal charges by severing alternately at different levels. Assuming a distance $c$—$d$ between severing planes equal to one-ninth of the length of $g$, then the sizes of the charges for the cycle will be of the proportionate lengths indicated at 16 and 17, or 8 to 10. If the distance between severing planes $c$—$e$ is made two-ninths of the length of $g$, the charges will be of the proportionate lengths indicated at 18 and 19, or 7 to 11. If the distance between severing planes $c$—$f$ is made three-ninths or one-third of the length of $g$, the charges will be of the proportionate lengths indicated at 20 and 21, or 6 to 12. The areas enclosed by the dotted lines below the shaded areas $g$ are, in each case, equal to that portion of the area $g$ lying between the severing planes, in the respective Figures. The closer the severing planes are together, the more nearly equal will be the sizes of the charges obtained by severing alternately at those planes.

If the severing is to be performed with a single pair of shears, the latter will be moved in the required succession to the different levels. In practicing the present method, it is not necessary to limit the movement of the shears to effect complete severing in any horizontal plane, since the shears may be lowered while severing to avoid piling of the glass thereon, or to effect rounding or pointing of the ends of the stubs from which the charges are severed, as described in U. S. Patents 1,362,785, of December 21, 1920, and 1,379,594, of May 24, 1921.

In any given cycle of operation, it may be desirable to sever a plurality of charges of equal weights in succession, followed by one or more charges of different weight in the same cycle. This can be done by the use of a suitable machine for carrying out this method, by employing cams for positioning and operating the severing means at the desired levels, in the proper sequence.

I claim:—

1. The method of producing mold charges of different sizes for making glassware, which comprises severing a column of molten glass in different planes in a recurrent cyclic order.

2. The method of producing mold charges of molten glass for making glassware of different weights, which comprises discharging the glass from a container, and severing the glass periodically at different levels in a recurrent cyclic order.

3. The method of producing mold charges of molten glass for making glassware of different weights, which comprises flowing glass from a container, severing the glass periodically at different levels in a recurrent cyclic order, and varying the levels to vary the weights.

4. The method of producing mold charges of different sizes for making glassware, which comprises severing a column of molten glass alternately at different locations in its path of discharge from a container.

5. The method of producing mold charges of different sizes for making glassware, which comprises severing glass issuing from an outlet at different distances from said outlet in a recurrent cyclic order.

Signed at Hartford, Connecticut, this 31st day of March, 1922.

WILLIAM A. LORENZ.